United States Patent
Ortalano et al.

(10) Patent No.: US 7,300,512 B2
(45) Date of Patent: Nov. 27, 2007

(54) METHOD OF MAKING PIGMENT DISPERSION CONTAINING A CARRIER SUCH AS CASTOR OIL OR VEGETABLE WAX

(75) Inventors: Darren Mark Ortalano, Cincinnati, OH (US); Jeffrey S. Carpenter, Loveland, OH (US); David Dick, Sparta, NJ (US); Lisa Soni Adams, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 71 days.

(21) Appl. No.: 10/495,258

(22) PCT Filed: Feb. 22, 2002
(Under 37 CFR 1.47)

(86) PCT No.: PCT/US02/05083

§ 371 (c)(1),
(2), (4) Date: Nov. 29, 2004

(87) PCT Pub. No.: WO02/068543

PCT Pub. Date: Sep. 6, 2002

(65) Prior Publication Data

US 2006/0070550 A1  Apr. 6, 2006

(51) Int. Cl.
C09C 3/08 (2006.01)
C09C 1/24 (2006.01)
C09B 67/10 (2006.01)
C09B 67/20 (2006.01)

(52) U.S. Cl. ............... 106/502; 106/460; 106/496; 106/504

(58) Field of Classification Search ............ 106/460, 106/496, 502, 504
See application file for complete search history.

(56) References Cited

U.S. PATENT DOCUMENTS

| 3,996,059 | A | * | 12/1976 | Stansfield et al. | .......... 106/413 |
| 4,217,265 | A | * | 8/1980 | Dietz et al. | ................... 524/90 |
| 4,484,952 | A | * | 11/1984 | Bes et al. | ................... 106/504 |
| 5,037,564 | A | * | 8/1991 | Nishizaki et al. | ........... 508/450 |
| 2003/0223940 | A1 | * | 12/2003 | Dransfield et al. | ............ 424/59 |

\* cited by examiner

*Primary Examiner*—David M Brunsman
(74) *Attorney, Agent, or Firm*—Theresa O'Rourke Nugent; Rademaker Nugent & Afflak

(57) ABSTRACT

A process of dispersing at least one pigment into a carrier such as castor oil or a vegetable wax such as palm oil glyceride wax. The resulting dispersion exhibits excellent color development and is fluid at room temperature. Suitable pigments include FD&C, D&C and inorganic pigments.

9 Claims, No Drawings

METHOD OF MAKING PIGMENT DISPERSION CONTAINING A CARRIER SUCH AS CASTOR OIL OR VEGETABLE WAX

This application is a 371 filing of PCT/US02/05083, filed 22 Feb. 2002.

BACKGROUND OF THE INVENTION

1. Field of the Invention

This invention relates to a method for making a dispersion containing at least one pigment and a carrier such as castor oil or a vegetable wax such as palm glyceride wax, and an improved dispersion produced by the process. The viscosity of the resulting dispersion is sufficiently high to prevent separation, yet sufficiently low to ensure good flow properties, including pourability.

2. Description of the Prior Art

Pigment dispersions comprise at least one pigment intimately admixed within a carrier. In the cosmetics industry, pigment dispersions have been made using batch processes based on slow mixers such as ball mills and three-roll mixers. These processes are inherently inefficient due to low throughput, long residence time, and recirculation of the material being processed. Moreover, these processes can produce a dispersion having an undesirably broad pigment particle size distribution. For maximum color strength, a narrow distribution of small sized pigment particles is required, since the color strength will be proportional to the surface area of the pigment present.

Castor oil-based pigment dispersions are used in the manufacture of lipstick. The castor oil serves to solubilize waxes and additives, and to provide a softness and smooth texture to the lipstick. The pigment is conventionally dispersed into castor oil using a two- or three-roll mill in a batch process. However, a high pigment loading (40% or more) is required to ensure high shear through the three-roll mill. The result is a very thick paste which is not pourable or pumpable, and which is believed to contain poorly-dispersed pigment particles having a broad particle size distribution. Subsequent addition of castor oil to reduce the viscosity of the paste can lead to eventual separation of the pigment from the castor oil. Moreover, the batch nature of this dispersion method is inefficient.

Cosmetic eyeliner pencils usually contain black pigment, a vegetable wax such as hydrogenated palm glyceride wax as a carrier, an alcohol such as dodecanol, and a black pigment. A three-roll mill is typically employed to disperse the pigment into the wax. Again, the batch nature of the mixing method is inefficient.

Continuous bead milling systems are commonly used to disperse both organic and inorganic pigments into aqueous systems such as water-based printing inks. See, for example, U.S. Pat. No. 4,015,999. These bead mills use a closed grinding chamber containing an internal rotor. Steel, glass or zirconium beads or shot having a diameter of from 0.5 to 1.0 micron is mixed with the pigment, and produce high impact collisions with the pigment aggregates during mixing, thereby breaking the aggregates down into individual particles. See "Milling Equipment", *The Printing Ink Manual* § 13.4 (D. E. Bisset et al. eds., 4th ed. 1988).

U.S. Pat. No. 3,996,059 discloses dispersing a pigment into an organic liquid such as a hydrocarbon and halogenated hydrocarbon by bead milling.

U.S. Pat. No. 5,037,564 discloses the ball mill grinding of a dispersion of pigments (azo pigments, phthalocyanine pigments, quinacridone, perinone and perylene pigments, etc.) in low acid value lanolin fatty acid and a non-aqueous dispersion medium, optionally together with a hydrogenated castor oil fatty acid. Imai et al., 65 *J. Jap. Soc. Col. Mat.* 544-50 (1992) discloses a "hybridised" dispersion of barium sulfate and Lithol Rubine B in castor oil prepared by a ball mill.

U.S. Pat. No. 4,484,952 discloses the "pearl mill" grinding of hydrogenated castor oil and carbon black to produce a dispersion having a particle size range of from 0.02 to 2 mm.

An object of the present invention is to provide an efficient method for producing pigment dispersions which possess excellent color development.

A feature of the present invention is the use of effective mixing for a time sufficient to uniformly disperse at least one pigment into a carrier such as castor oil or a vegetable wax.

Another feature of the present invention is that the pigment particles dispersed in the carrier exhibit a narrow range of particle size distribution.

An advantage of the present invention is that the nature of the process permits higher throughput and lower cost than the batch processes of the prior art.

SUMMARY OF THE INVENTION

In one aspect, the present invention relates to a process for preparing a dispersion, which comprises
  (i) premixing at least one pigment with a carrier selected from the group consisting of a castor oil and a vegetable wax to produce a mixture; and
  (ii) effectively mixing the mixture for a time sufficient to uniformly disperse said pigment in said carrier to produce a dispersion having a narrow range of particle size distribution.

In a second aspect, the present invention relates to a pigment dispersion, comprising at least one pigment dispersed in a carrier, said dispersion having a viscosity of from 2,000 to 5,500 cps and a narrow range of particle size distribution, and produced by a process which comprises
  (i) premixing at least one pigment with a carrier selected from the group consisting of castor oil and vegetable wax to produce a mixture; and
  (ii) effectively mixing the mixture for a time sufficient to uniformly disperse said pigment in said carrier to produce a dispersion having a narrow range of particle size distribution.

DETAILED DESCRIPTION OF THE PREFERRED EMBODIMENTS

The pigments which can be used to make the dispersion of the present invention include FC&C, D&C and inorganic pigments. Black Iron Oxide, Red Iron Oxide, Yellow Iron Oxide, D&C Red No. 7, FD&C Yellow No. 5, FD&C Yellow No. 6, and mixtures thereof are particularly preferred, and are commercially available.

Those of ordinary skill in the art are well aware that pigments can be in the form of a dry powder, an aqueous pigment presscake or a non-aqueous flush. A dry powder pigment presents dust problems, and is non-preferred. The water in a presscake must be replaced with a suitable vehicle such as an oil or a resin solution to form a non-aqueous pigment flush using known apparatus and techniques. A non-aqueous flush can be used in this invention without any pretreatment.

The carrier of the present invention may be, for example, a castor oil or a vegetable wax. A grade of castor oil which primarily contains the triglyceride of ricinoleic acid is preferred for use in this invention. It is characterized by a very low acid number of less than 10, and a high hydroxyl value of above 150. Castor oil having these characteristics is commercially available.

Vegetable waxes which may be suitable for use in the present invention include hydrogenated palm glyceride wax, carnauba wax, candelilla wax, bayberry wax and sugar cane wax. Hydrogenated palm glyceride wax has a melting point range of from 95 to 100° F., and a viscosity of 42 cps at 100° F.

The first step in the process of the present invention is a premixing step to form a mixture of the carrier and the pigment. When the carrier is castor oil, from 20 to 35% by weight of at least one pigment is mixed with from 65 to 80 weight percent castor oil for a time sufficient to initially dissolve the pigment into the castor oil. When the carrier is a vegetable wax such as hydrogenated palm glyceride wax, from 70-50% by weight of pigment may be mixed with from 30 to 50 weight percent of carrier.

The time period required for premixing will depend on the carrier selected, relative proportions of the components, the premixing speed and the temperature. Generally, an adequate premixing period will range from 5 to 45 minutes, preferably 15 to 30 minutes.

The premixing step can be performed in any conventional high shear mixing equipment such as a Cowles dissolver or a single blade mixer, a Banbury mill or a Gaullin homogenizer. It is preferred to add the pigment to the carrier.

The second step of the process involves effectively mixing the mixture for a time sufficient to uniformly disperse the pigment in the carrier to produce a dispersion having a narrow range of particle size distribution. One apparatus which is suitable for effective mixing is a bead mill. Any conventional horizontal or vertical bead mixer may be used, preferably in recirculating mode and at an operating temperature of from 50 to 110° F., preferably 75 to 90° F. Suitable beads include steel, glass or zirconium shot having a diameter of from 0.50 to 1.0 micron. The mixture formed by the premixing step may be transferred to the bead mixer by any convenient method, including pumping and screw feeder.

The pigment dispersions produced by this process have a room temperature viscosity of from 2,000 to 5,500 cps, preferably 2000 to 4000 cps, and are thus sufficiently fluid at room temperature to be pumpable and pourable. They are coloristically strong in comparison to pigment dispersions prepared by three roll mixing, and are resistant to pigment settling over time.

EXAMPLES

The practice and advantages of the present invention are disclosed in even greater detail in the following Examples, which are illustrative only, and not intended to limit the allowable scope of invention in any manner whatsoever.

Example 1

Formation of a Castor Oil-Based Premix

Seven pigment mixtures were prepared using CRYSTAL O castor oil, commercially available from CasChem, Inc., Bayonne, N.J. This castor oil is primarily composed of the triglyceride ester of ricinoleic acid, has an acid value of 2, an iodine (hydroxyl) value of 66, and a viscosity of 900 cps.

In each instance, the pigment was added to the castor oil using a Cowle's mixer for 15 to 30 minutes to form a paste.

Example 2

Bead Milling to Form a Dispersion

The seven mixtures prepared in Example 1 were subjected to bead milling using a commercially available Eiger mill operating in recirculating mode at a temperature of 75 to 90° F. using glass particles. Table 1 below shows the pigments, pigment concentration, and viscosity of the resulting dispersions:

TABLE 1

| Dispersion | Pigment Type | Pigment weight Percentage | Viscosity (cps) |
| --- | --- | --- | --- |
| II-1 | Red Oxide | 35.0 | 3555 |
| II-2 | D&C Red No. 7 | 25.0 | 5260 |
| II-3 | FD&C Yellow No. 6 | 25.0 | 2610 |
| II-4 | Red Oxide | 20.0 | 2730 |
| II-5 | Yellow Oxide | 20.0 | 2540 |
| II-6 | D&C Red No. 7 | 20.0 | 2040 |
| II-7 | FD&C Yellow No. 5 | 20.0 | 3680 |

Example III

Formation of Dispersion Using Three-Roll Milling

Three control pigment dispersions were prepared by three-roll milling pastes prepared according to the procedures of Example 1 using conventional equipment and techniques. Table 2 lists the pigment and pigment weight percentage of these control dispersions:

TABLE 2

| Dispersion | Pigment Type | Pigment weight Percentage | Viscosity |
| --- | --- | --- | --- |
| III-1 | Red Oxide | 40% | Very Thick Paste |
| III-2 | D&C Red No. 7 | 40% | Very Thick Paste |
| III-3 | FD&C Yellow No. 6 | 40% | Very Thick Paste |

The control dispersions III-1 through III-3 were reduced to an pigment loading equal to dispersions II-1 through II-3, and then compared for color strength by tinting into a white flush paste via mulling. In each case, the dispersions prepared by bead milling exhibited stronger color development than dispersions prepared by three-roll milling.

Example 4

Formation of a Vegetable Wax-Based Premix

A pigment mixture was prepared from hydrogenated palm glyceride wax, commercially available from M.M.P., Inc., and black iron oxide pigment. The pigment was mixed with the melted wax using a Cowle's mixer for a period of 20 minutes. The resulting premix had a viscosity of 972 cps at 100° F.

Example 5

Bead Milling to Form a Dispersion

The temperature of the premix was raised to 118° F. prior to bead milling for 12 minutes using a commercially available Eiger mill operating in recirculating mode at a temperature of 118° F. and glass particles.

The tinting strength of the resulting dispersion was evaluated against that of a control sample prepared using a three-roll mill and which contained 40% pigment. Tinting strength was evaluated by the use of a white wax base that is fluid at 75° F., uncoated Leneta paper (3NT-1, the Leneta Company) and a color computer (X-Rite Corp.). The white wax base contains 40 percent by weight titanium dioxide pigment (C.I. Pigment White 6) dispersed into 60 percent by weight Vybar 825 branched polyethylene wax (Petrolite Cororation).

Before solidification the black dispersions were added to the white tint base as follows: 2 grams of black dispersion were handmixed into 20 grams of white wax. Side-by-side drawndowns of the black tints were then made on the uncoated paper using a blade applicator. The color computer was used to determine strength differences.

TABLE 3

| Dispersion | Strength (%) |
| --- | --- |
| Premix Only | 102.85 |
| Three Roll Mill Control | 100.00 |
| Bead Mill | 140.00 |

What is claimed is:

1. A process for preparing a dispersion, which comprises
   (i) premixing a pigment by means of a high shear mixer selected from the group consisting of a Cowles dissolver, a single blade mixer, a Banbury mill, and a Gaullin homogenizer with a carrier selected from the group consisting of castor oil and a vegetable wax to produce a mixture; and
   (ii) effectively mixing the mixture by means of a bead mill for a time sufficient to uniformly disperse said pigment in said carrier to produce a dispersion having a particle size distribution.

2. The process of claim 1, in which said mixing step (ii) is performed at 60 to 101° F.

3. The process of claim 2, in which said mixing step (ii) is performed at 75 to 95° F.

4. The process of claim 1, wherein said pigment is at least one member of the group consisting of Black Iron Oxide, Red Iron Oxide, Yellow Iron Oxide, D&C Red No. 7, FD&C Yellow No. 5, FD&C Yellow No. 6, and mixtures thereof.

5. The process of claim 1, wherein said mixing step (ii) employs at least one member at the group consisting of steel, glass and zirconium shot.

6. The process of claim 1, wherein said carrier is castor oil.

7. The process of claim 1, wherein said carrier is a vegetable wax.

8. The process of claim 7, wherein said vegetable wax comprises palm oil glyceride wax.

9. A pigment dispersion produced by the process of claim 1, having a viscosity of from 2,000 to 5,500 cps and a particle size distribution.

\* \* \* \* \*